US012196154B2

(12) United States Patent
Berube

(10) Patent No.: US 12,196,154 B2
(45) Date of Patent: Jan. 14, 2025

(54) ROTARY ENGINE WITH SEAL HAVING ELASTOMERIC AND METALLIC MEMBERS

(71) Applicant: PRATT & WHITNEY CANADA CORP., Longueuil (CA)

(72) Inventor: Stephane Berube, St-Philippe (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/326,102

(22) Filed: May 31, 2023

(65) Prior Publication Data

US 2024/0401545 A1 Dec. 5, 2024

(51) Int. Cl.

| | |
|---|---|
| ***F02F 11/00*** | (2006.01) |
| ***F02B 55/08*** | (2006.01) |
| ***F02B 55/10*** | (2006.01) |
| *F02B 53/00* | (2006.01) |

(52) U.S. Cl.

CPC ............ *F02F 11/007* (2013.01); *F02B 55/08* (2013.01); *F02B 55/10* (2013.01); *F02B 2053/005* (2013.01)

(58) Field of Classification Search

CPC ......... F02F 11/007; F02B 55/08; F02B 55/10; F02B 2053/005

See application file for complete search history.

(56) References Cited

U.S. PATENT DOCUMENTS

| | | | | | |
|---|---|---|---|---|---|
| 3,359,953 | A * | 12/1967 | Groth | F02B 53/00 | 418/179 |
| 3,791,781 | A * | 2/1974 | Fujiyama | F02B 53/00 | 418/179 |
| 3,809,509 | A * | 5/1974 | Lamm | F01C 19/08 | 418/60 |
| 3,844,694 | A * | 10/1974 | Lamm | F02B 53/00 | 418/149 |
| 3,964,843 | A * | 6/1976 | Terazawa | F01C 21/104 | 418/83 |
| 3,980,412 | A | 9/1976 | Terazawa et al. | | |
| 8,985,085 | B2 | 3/2015 | Gekht et al. | | |
| 11,333,068 | B1 * | 5/2022 | Savaria | F01C 1/22 | |

* cited by examiner

*Primary Examiner* — Audrey B. Walter

(74) *Attorney, Agent, or Firm* — NORTON ROSE FULBRIGHT CANADA LLP

(57) ABSTRACT

A housing assembly for a rotary engine, has: a rotor housing having an inner face facing a rotor cavity, a first side and a second side opposite to the first side; a first side housing secured to the first side, and a second side housing secured to the second side, the rotor cavity bounded axially between the first side housing and the second side housing; and a seal received within a groove at an interface between the rotor housing and the first side housing, the groove located outwardly of the inner face and overlapping a peripheral section of the first side housing, the seal having: an elastomeric member compressed between the peripheral section and the rotor housing; and a metallic member disposed inwardly of the elastomeric member, the metallic member in contact with both of the peripheral section of the first side housing and the rotor housing.

16 Claims, 9 Drawing Sheets

ROTARY ENGINE WITH SEAL HAVING ELASTOMERIC AND METALLIC MEMBERS

TECHNICAL FIELD

The application relates generally to internal combustion engines and, more particularly, to rotary internal combustion engines.

BACKGROUND

Combustion chambers of a rotary engine, such as a Wankel engine, are delimited radially by the rotor and rotor housing and axially by a side housing. The side housing faces the combustion chambers and is thus subjected to high pressure and thermal loads. On the other hand, the side housing provides the running surface for the rotor's side seals.

SUMMARY

In one aspect, there is provided a housing assembly for a rotary internal combustion engine, comprising: a rotor housing extending around an axis, the rotor housing having an inner face facing a rotor cavity, a first side and a second side opposite to the first side; a first side housing secured to the first side of the rotor housing, and a second side housing secured to the second side of the rotor housing, the rotor cavity bounded axially between the first side housing and the second side housing; and a seal received within a groove at an interface between the rotor housing and the first side housing, the groove annularly extending around the axis, located outwardly of the inner face of the rotor housing, and overlapping a peripheral section of the first side housing, the seal having: an elastomeric member compressed between the peripheral section of the first side housing and the rotor housing; and a metallic member disposed inwardly of the elastomeric member relative to the axis, the metallic member in contact with both of the peripheral section of the first side housing and the rotor housing.

The housing assembly described above may include any of the following features, in any combinations.

In some embodiments, the first side housing includes a side wall secured to the rotor housing and a side plate, a peripheral section of the side plate disposed between the side wall and the rotor housing.

In some embodiments, a gap is defined between the rotor housing and the peripheral section of the side plate, the groove communicating with the rotor cavity through the gap.

In some embodiments, a cross-section of the metallic member includes at least two crests and a valley located between the at least two crests, the metallic member being compressible in a direction parallel to the axis.

In some embodiments, a cross-section of the metallic member has an E-shape.

In some embodiments, a pressure force generated by the metallic member on the first side housing is at most about 150 pounds by inch of length of the metallic member.

In some embodiments, the pressure force is at least 25 pounds by inch.

In some embodiments, the metallic member is made of a material having a melting point above a temperature of combustion gases inside the rotor cavity.

In some embodiments, a coolant circuit is within the rotor housing, the first side housing, and the second side housing, the seal fluidly separating the coolant circuit from the rotor cavity.

In another aspect, there is provided a rotary internal combustion engine comprising: a rotor; a rotor housing extending around an axis, the rotor housing having an inner face facing a rotor cavity containing the rotor, a first side and a second side opposite to the first side; a first side housing secured to the first side of the rotor housing, a second side housing secured to the second side of the rotor housing, the rotor located axially between the first side housing and the second side housing, and circumscribed by the rotor housing; and a seal received within a groove at an interface between the first side housing and the rotor housing, the groove annularly extending around the axis, located outwardly of the inner face of the rotor housing, and overlapping a peripheral section of the first side housing, the seal having: an elastomeric member compressed between the peripheral section of the first side housing and the rotor housing; and a metallic member in contact with both of the peripheral section of the first side housing and the rotor housing, the metallic member located radially between the inner face of the rotor housing and the elastomeric member.

The rotary internal combustion engine described above may include any of the following features, in any combinations.

In some embodiments, the first side housing includes a side wall secured to the rotor housing and a side plate, a peripheral section of the side plate disposed between the side wall and the rotor housing.

In some embodiments, a gap is defined between the rotor housing and the peripheral section of the side plate, the groove communicating with the rotor cavity through the gap.

In some embodiments, a cross-section of the metallic member includes at least two crests and a valley located between the at least two crests, the metallic member being compressible in a direction parallel to the axis.

In some embodiments, a cross-section of the metallic member has an E-shape.

In some embodiments, a pressure force generated by the metallic member on the first side housing is at most about 150 pounds by inch of length of the metallic member.

In some embodiments, the pressure force is at least 25 pounds by inch.

In some embodiments, the metallic member is made of a material having a melting point above a temperature of combustion gases inside the rotor cavity.

In some embodiments, a coolant circuit is within the rotor housing, the first side housing, and the second side housing, the seal fluidly separating the coolant circuit from the rotor cavity.

In yet another aspect, there is provided a method of sealing a rotary internal combustion engine having a rotor cavity bounded by a rotor housing and a side housing, the method comprising: mitigating leakage of combustion gases out of the rotor cavity with an elastomeric member at an interface between the rotor housing and the side housing; and protecting the elastomeric member from the combustion gases with a metallic member disposed between the elastomeric member and the rotor cavity.

In some embodiments, the protecting of the elastomeric member from the combustion gases with the metallic member includes compressing an E-seal between the rotor housing and the side housing.

BRIEF DESCRIPTION OF THE DRAWINGS

Reference is now made to the accompanying figures in which.

DETAILED DESCRIPTION

Figure 1:
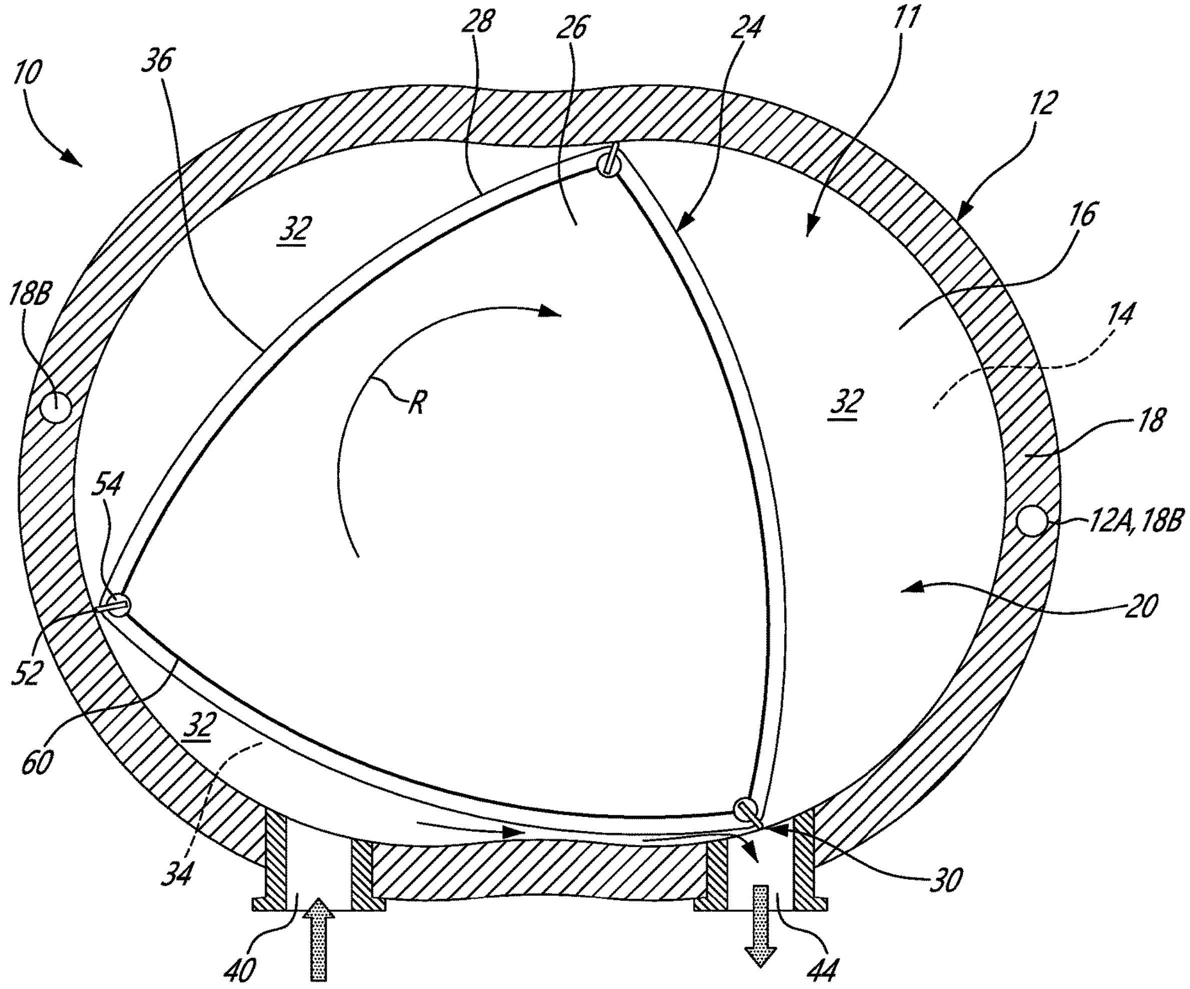
FIG. 1 is a schematic cross-sectional view of a rotary internal combustion engine in accordance with one embodiment.

Referring to FIG. 1, a rotary internal combustion engine, referred to simply as a rotary engine below, which may be a Wankel engine, is schematically shown at 10. The rotary engine 10 comprises an outer body also referred to as a housing assembly 12 having axially-spaced side housings 11, which each includes a side wall 14 and a side plate 16 mounted to the side wall 14, with a rotor housing 18 extending from one of the side housings 11 to the other, to form a rotor cavity 20. The rotor housing 18 has a first side and a second side opposite to the first side. The side housings 11 include a first side housing secured to the first side and a second side housing secured to the second side. The rotor cavity 20 is defined axially between the side housings 11 and circumscribed by the rotor housing 18. In FIG. 1, the side wall 14 is indicated with a dashed line because it sits below the side plate 16. The inner surface of the rotor housing 18 has a profile defining two lobes, which may be an epitrochoid. In some alternate embodiments, the side housings 11 include solely the side wall, that is, the side wall and the side plate may be combined into a single element.

The housing assembly 12 includes a coolant circuit 12A, which may include a plurality of coolant conduits 18B defined within the rotor housing 18. As shown more clearly in FIG. 5, the coolant conduits 18B extends from one of the side housings 11 to the other. The coolant circuit 12A is used for circulating a coolant, such as water or any suitable coolant, to cool the housing assembly 12 during operation of the rotary engine 10. Although only two coolant conduits 18B are shown, it is understood that more than two coolant conduits 18B may be used without departing from the scope of the present disclosure.

An inner body or rotor 24 is received within the rotor cavity 20. The rotor 24 has axially spaced end faces 26 adjacent to the side walls 14, and a peripheral face 28 extending there between. The peripheral face 28 defines three circumferentially-spaced apex portions 30, and a generally triangular profile with outwardly arched sides 36. The apex portions 30 are in sealing engagement with the inner surface of rotor housing 18 to form three rotating combustion chambers 32 between the rotor 24 and housing assembly 12. The combustion chambers 32 vary in volume with rotation of the rotor 24 within the housing assembly 12. The geometrical axis of the rotor 24 is offset from and parallel to the axis of the housing assembly 12. In some embodiments, more or less than three rotating combustion chambers may be provided with other shapes of the rotor.

The combustion chambers 32 are sealed. In the embodiment shown, each rotor apex portion 30 has an apex seal 52 extending from one end face 26 to the other and biased radially outwardly against the rotor housing 18. An end seal 54 engages each end of each apex seal 52 and is biased against the respective side wall 14. Each end face 26 of the rotor 24 has at least one arc-shaped face seal 60 running from each apex portion 30 to each adjacent apex portion 30, adjacent to but inwardly of the rotor periphery throughout its length, in sealing engagement with the end seal 54 adjacent each end thereof and biased into sealing engagement with the adjacent side plates 16 of the side housings 11. Alternate sealing arrangements are also possible.

Although not shown in the Figures, the rotor 24 is journaled on an eccentric portion of a shaft such that the shaft rotates the rotor 24 to perform orbital revolutions within the rotor cavity 20. The shaft may rotate three times for each complete rotation of the rotor 24 as it moves around the rotor cavity 20. Oil seals are provided around the eccentric to impede leakage flow of lubricating oil radially outwardly thereof between the respective rotor end face 26 and side housings 11. During each rotation of the rotor 24, each chamber 32 varies in volumes and moves around the rotor cavity 20 to undergo the four phases of intake, compression, expansion and exhaust, these phases being similar to the strokes in a reciprocating-type internal combustion engine having a four-stroke cycle.

The engine includes a primary inlet port 40 in communication with a source of air and an exhaust port 44 In the embodiment shown, the ports 40, 44 are defined in the rotor housing 18. Alternate configurations are possible.

In a particular embodiment, fuel such as kerosene (jet fuel) or other suitable fuel is delivered into the chamber 32 through a fuel port (not shown) such that the chamber 32 is stratified with a rich fuel-air mixture near the ignition source and a leaner mixture elsewhere, and the fuel-air mixture may be ignited within the housing using any suitable ignition system known in the art (e.g. spark plug, glow plug). In a particular embodiment, the rotary engine 10 operates under the principle of the Miller or Atkinson cycle, with its compression ratio lower than its expansion ratio, through appropriate relative location of the primary inlet port 40 and exhaust port 44.

Referring now to FIGS. 2-5, one of two side housings 11 of the housing assembly 12 is illustrated. As briefly introduced above, the side housings 11 include the side walls 14 that are secured to the rotor housing 18. Each of the side walls 14 has a portion located proximate an outer perimeter P (FIG. 4) of the side wall 14 and configured to be in abutment against the rotor housing 18 for defining the rotor cavity 20.

In the embodiment shown, each of the side walls 14 is configured to be secured to a respective one of opposed ends of the rotor housing 18. The side housings 11 further include side plates 16 located on inner sides of the side walls 14. The side plates 16 define rotor-engaging faces 16A on which the side seals 60 and the corner seals 54 of the rotor 24 are in abutment during rotation of the rotor 24. The side plates 16 further define back faces opposite the rotor-engaging faces 16A. The back faces of the side plates 16 face the side walls 14.

The side walls 14 may be made of aluminum, more specifically an aluminum alloy, due to its light weight and high thermal conductivity. However, it may be required that the surfaces of the side walls 14 in contact with the seals 54, 60 be coated to provide a wear-resistance surface. In the embodiment shown, the side plates 16 are made of aluminum and coated with a hard material such as silicon carbide, aluminum nitride, chromium carbide, tungsten carbide, and so on. Any suitable wear resistant coating applied by thermal spray or any other suitable method may be used. The side walls 14 and the side plates 16 will be described in more details below. Although the text below uses the singular form, the description may be applied to both of the side walls 14 and to both of the side plates 16. The side plates 16 may however be entirely made of the hard material, such as silicon carbide. The side plates 16 may be made of aluminum, steal, or any suitable ceramic.

Figure 4:
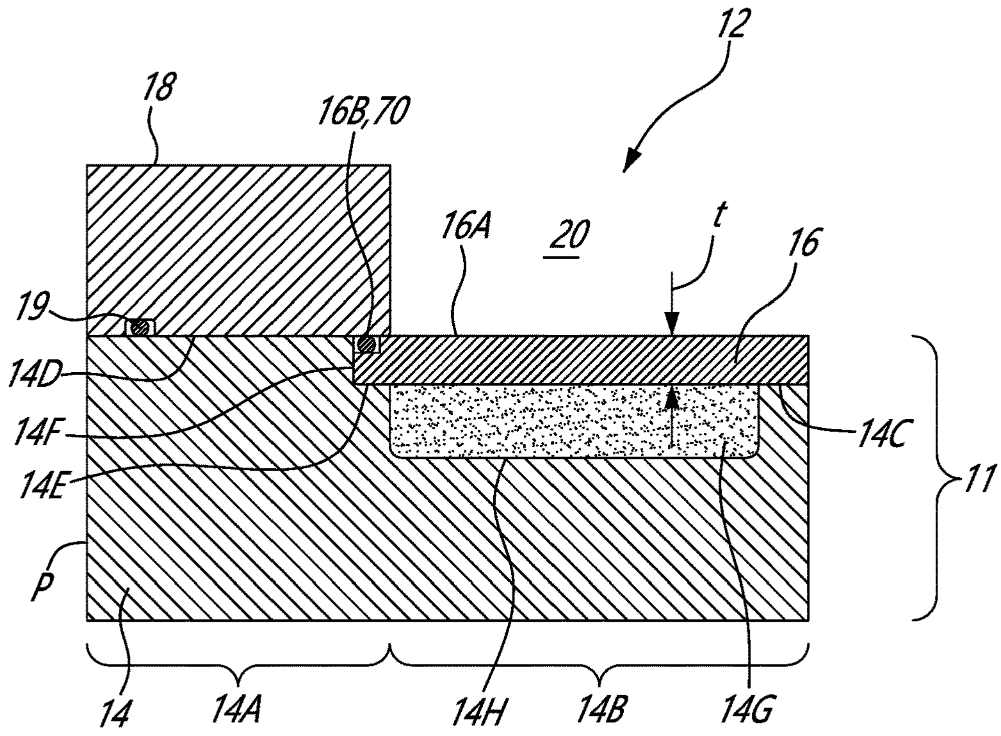
FIG. 4 is a schematic cross-sectional view taken along line B-B of FIG. 2 in accordance with one embodiment.

Referring more particularly to FIG. 4, the side wall 14 includes a peripheral section 14A, which is in abutment with the rotor housing 18, and a center section 14B, which is circumferentially surrounded by the peripheral section 14A. In the disclosed embodiment, the peripheral section 14A of the side wall 14 is secured to the rotor housing 18. The center section 14B of one of the side walls 14 faces the center section 14B of the other of the side walls 14. The side walls 14 are secured to the rotor housing 18 with any suitable means known in the art. As shown, a sealing member 19 is located between the rotor housing 18 and the peripheral sections 14A of the side walls 14 for limiting coolant and combustion gases from leaking out. The sealing member 19 may be an O-ring. The sealing member 19 may be received within an annular recess, which may be defined by one or more of the rotor housing 18 and the side wall 14.

The side wall 14 defines a recess 14C for receiving the side plate 16. The peripheral section 14A of the side wall 14 extends from the outer perimeter P to the recess 14C. As shown, a surface 14D of the peripheral section 14A of the side wall 14 that faces the rotor housing 18 is axially offset from a surface 14E of the center section 14B of the side wall 14. A magnitude of the offset corresponds to a depth of the recess 14C and may correspond to a thickness t of the side plate 16 plus any axial gap defined between a rotor-engaging face of the side plate 16 and the rotor housing 18. The side plate 16 is therefore in abutment with the surface 14E of the center section 14B of the side wall 14. In other words, a sealing surface of the side plate 16, located on a side of the side plate 16 that faces the rotor cavity, may be aligned with the peripheral section 14A of the side wall 14.

The side wall 14 defines an abutment surface 14F. The abutment surface 14F is defined by a shoulder created by the offset of the surfaces 14D, 14E of the peripheral and central sections 14A, 14B of the side wall 14. The side wall 14, via its abutment surface 14F, limits radial movements of the side plate 16 relative to the axis of rotation of the rotor 24. The side plate 16 may be supported by a housing in the center to limit the movement of the side plate 16.

In a particular embodiment, a gap may remain between a peripheral section of the side plate 16 and the abutment surface 14F of the side wall 14. In other words, and in the embodiment shown, the side plate 16 may be spaced apart from the abutment surface 14F. A size of the gap may change during operation of the rotary engine 10 as the side wall 14 and the side plate 16 may expand at different rates with an increase of a temperature in the rotor cavity 20. In other words, the space between the side plate 16 and the abutment surface 14F of the side wall 14 may allow relative thermal expansion between the side plate 16 and the side wall 14 so that thermal stress transferred from the side plate 16 to the rotor housing 18 and the side wall 14 might be minimized.

To limit axial movements of the side plate 16 relative to the axis of rotation of the rotor 24 (FIG. 1), a periphery of the side plate 16 is contained axially between the rotor housing 18 and the side wall 14. In other words, the periphery of the side plate 16 is sandwiched between the side wall 14 and the rotor housing 18. A seal 70 is located at the periphery of the side plate 16 for limiting the combustion gases to leak out of the rotor cavity 20 and for limiting the cooling fluid from leaking into the combustion chamber 32 (FIG. 1). As shown more specifically in FIGS. 4-5, the seal 70 is contained within a groove 16B defined by the side plate 16. The seal 70 is described in detail below.

In a particular embodiment, the seal 70 and the abutment surface 14F of the side wall 14 allows the side plate 16 to move radially relative to the side wall 14. Such a movement, along a radial direction relative to the axis of rotation of the rotor 24, may be required in a configuration in which the side wall 14 is made of a material having a coefficient of thermal expansion different than that of the side plate 16 and/or because the different components may be exposed to different temperatures and, thus may exhibit different thermal expansion.

The side wall 14 further defines a pocket 14G that may circumferentially extend a full circumference of the side wall 14. In other words, the pocket 14G is annular. More than one pocket may be used. The pocket 14G may not cover an entirety of the center section 14B of the side wall 14. The pocket 14G is configured for circulating a liquid coolant, such as water for cooling the side plate 16. The pocket 14G may be part of the coolant circuit 12A and is in fluid flow communication with the coolant conduits 18B that are defined in the rotor housing 18. The pocket 14G extends from the surface 14E of the center section 14B and away from the rotor cavity 20. A depth D (FIG. 5) of the pocket 14G is defined by a distance along the axis of rotation of the rotor 24 between the surface 14E of the center section 14B and a bottom surface 14H of the pocket 14G.

Figure 2:
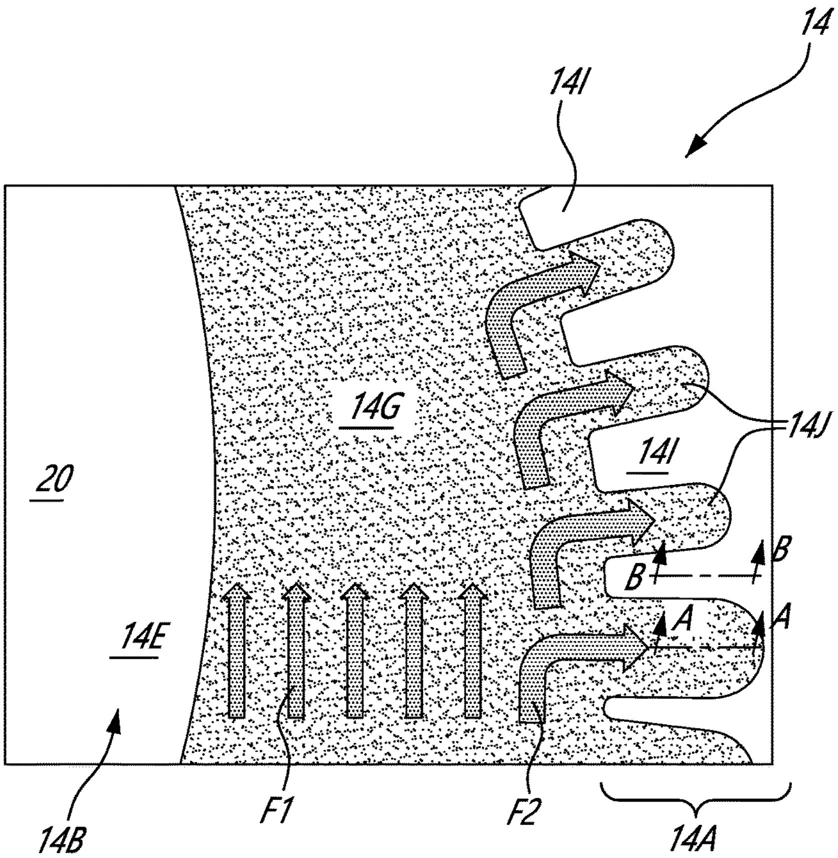
FIG. 2 is a schematic fragmented top view of a side wall of a side housing of the rotary internal combustion engine of FIG. 1.
Figure 3:
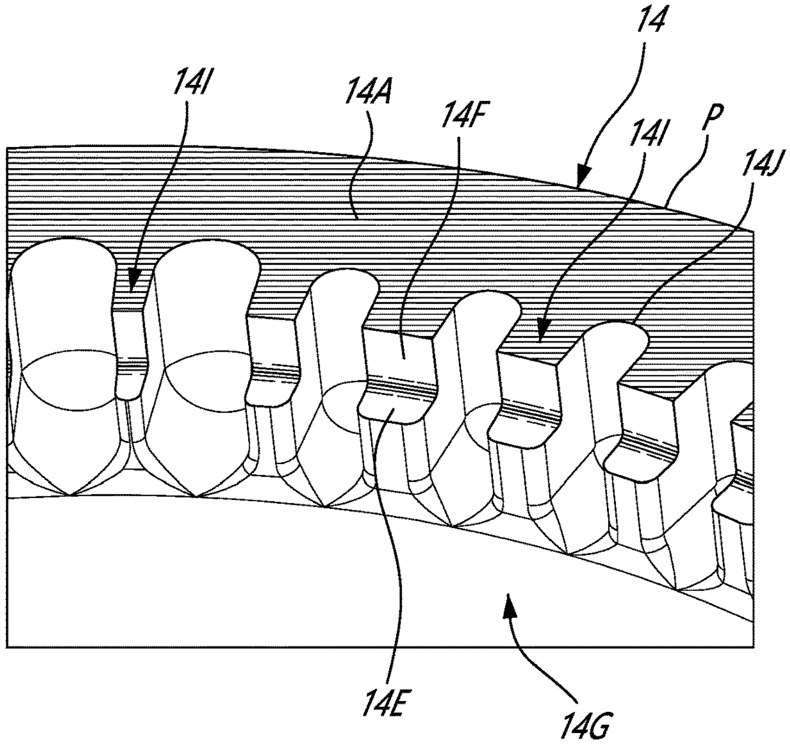
FIG. 3 is a schematic fragmented three-dimensional view of the side wall of FIG. 2.

As shown in FIGS. 2-3, the peripheral section 14A of the side wall 14 defines a plurality of ribs 14I that are circumferentially distributed around the rotor cavity 20. The ribs 14I defines the abutment surface 14F and a portion of the surface 14E of the center section 14B of the side wall 14. Consequently, and in the depicted embodiment, the abutment surface 14F is defined by a plurality of surfaces defined by the ribs 14I. The ribs 14I may be configured to support a pressure load imparted by a combustion of a mixture of air and fuel within the combustion chambers 32.

Cavities or spaces 14J are defined between the ribs 14I. More specifically, each pair of two consecutive ones of the ribs 14I defines a space 14J therebetween. The spaces 14J are in fluid communication with the pocket 14G and with the coolant conduits 18B of the rotor housing 18. Stated otherwise, the coolant conduits 18B are in fluid communication with the pocket 14G via the spaces 14J between the ribs 14I. The spaces 14J may allow the liquid coolant to flow from the pocket 14G to the coolant conduits 18B of the rotor housing 18. It is understood that the liquid coolant may be circulated in closed loop and through a heat exchanger. The heat exchanger may be used to dissipate heat to an environment outside the engine; the heat transferred from the engine to the liquid coolant.

Figure 5:
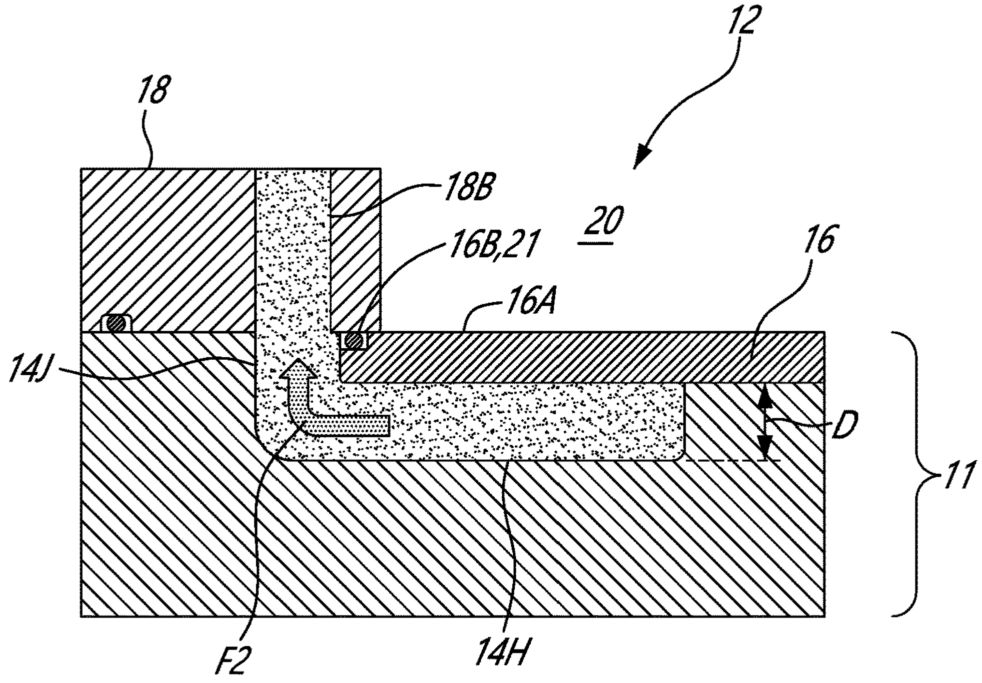
FIG. 5 is a schematic cross-sectional view taken along line A-A of FIG. 2 in accordance with the embodiment of FIG. 4.

As shown in FIGS. 2 and 5, a flow F1 of the liquid coolant circulates within the pocket 14G. The flow F1 is divided in sub-flows F2; each of the sub-flows F2 circulating within a respective one of the spaces 14J and within a respective one of the coolant conduits 18B of the coolant circuit 12A. The liquid coolant may be circulated out of the housing assembly 12 and within a heat exchanger for extracting the heat. The liquid coolant may then be reinjected in the coolant circuit 12A for further heat extraction.

Figure 6:
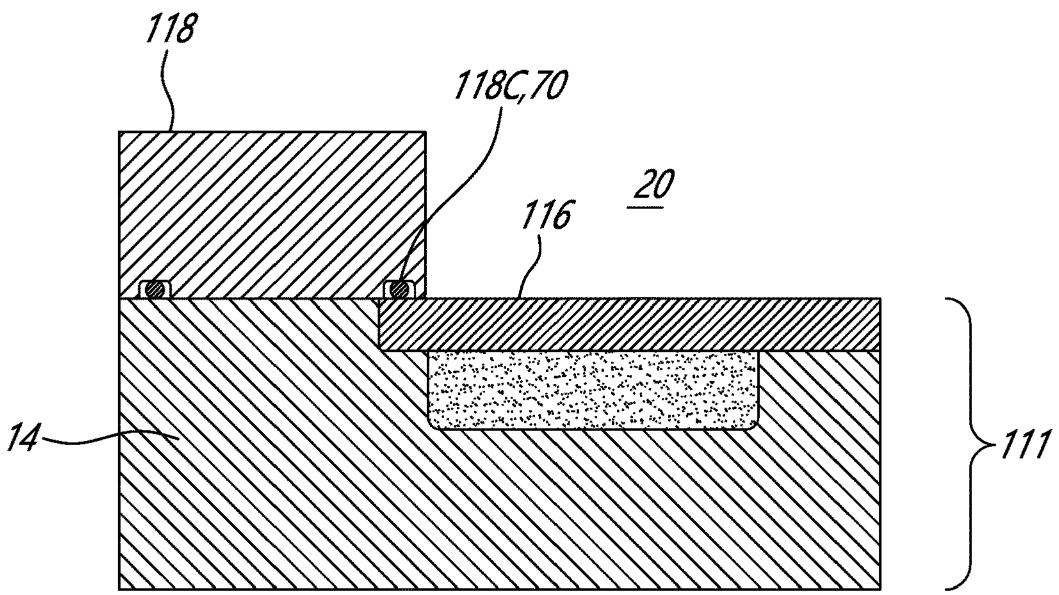
FIG. 6 is a schematic cross-sectional view taken along line B-B of FIG. 2 in accordance with another embodiment.

Referring now to FIG. 6, another embodiment of the outer body, more specifically of the side housing 111 and rotor housing 118, is generally shown. For the sake of conciseness, only elements that differ from the housing assembly 12 of FIGS. 2-5 are described. In the embodiment shown, the rotor housing 118 defines a groove 118C that receives the seal 70.

The description below refers more particularly to the embodiment of FIG. 7 in which the rotor housing 118 defines a groove annularly extending around the axis of the housing assembly 12. It will however be appreciated that the principles of the present disclosure apply equally to the embodiment of FIG. 4 in which the seal 70 is received within a recess or a groove defined by the side plate 116. In some embodiments, the seal 70 maybe received within a groove or recess defined conjointly by both the rotor housing 18 and the side plate 116. The seal 70 may thus be located outwardly of the inner face of the rotor housing 18 and overlaps a peripheral section of the side housing 111. This peripheral section corresponds to the section of the side housing 111 or side plate 116 that is overlapped by the rotor housing 118. Herein, since the side housing 111 includes a side wall 14 secured to the rotor housing 118 and a side plate 116, the peripheral section corresponds to a section of the side plate 116 that is dispose axially between, or sandwiched, between the rotor housing 118 and the side wall 14.

Figure 7:
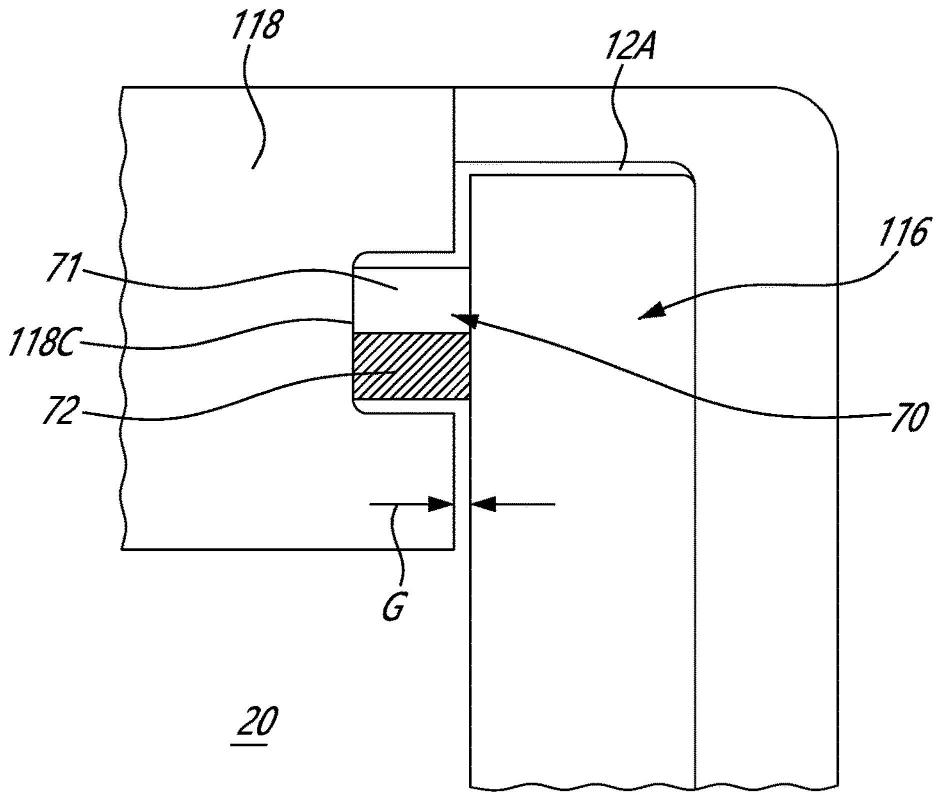
FIG. 7 is an enlarged view of a portion of FIG. 6.

Referring now to FIG. 7, the seal 70 is used to prevent leakage of the combustion gases out of the rotor cavity 20 and to prevent the liquid coolant from leaking out of the coolant circuit 12A. However, there is a gap G defined axially between the side plate 116 and the rotor housing 118. This gap G is present to ensure that the side plate 116 is not within the engine clamping stack and thus to avoid transmitting axial load generated by fastening the rotor housing 118 to the side housings 111. The coolant flowing within the coolant circuit 12A is used to maintain the metal temperatures around the seal 70 within an acceptable level. However, in the embodiment shown, the gap G has a dimension of about 0.004"±0.0007. Other dimensions are contemplated. The gap G is sized to reduce the loading of the side plates 116 due to thermal expansions. As a result, the gap G may remain open at some circumferential locations during operation of the engine. This may allow hot combustion gases to impinge on the seal 70. The seal 70 of the present disclosure may be designed to withstand these harsh operating conditions. The seal 70 may adequately seal the rotor cavity 20 from the coolant circuit 12A and limit axial clamping load on the side plates 116 to less than 5000 lbs.

In the embodiment shown, the seal 70 includes an elastomeric member 71 and a metallic member 72, also referred to as a metallic seal. The elastomeric member 71 is compressed between the peripheral section of the side housing 111 and the rotor housing 118. More specifically, the elastomeric member 71 is compressed between the peripheral section of the side plate 116 and the rotor housing 118, herein within the groove 118C. The elastomeric member 71 may be made of any suitable material such as, for instance, Viton™, silicone, perfluoroelastomer, fluorocarbon-based fluoroelastomer, and so on.

The metallic member 72 is disposed inwardly of the elastomeric member 71 relative to the axis of rotation of the rotor 24 (FIG. 1). The metallic member 72 is therefore located radially between the inner face of the rotor housing 118 and the elastomeric member 71; the inner face of the rotor housing 118 being in sealing contact with the rotor 24. The metallic member 72 is in contact with both of the peripheral section of the side housing 111 and the rotor housing 118, herein in contact with both of the rotor housing 118 within the groove 118C and with the side plate 116. The elastomeric member 17 and metallic member 72 contact both of the rotor housing 118 and the side plate 116 and may be compressed therebetween. The metallic member 72 is made of a material having a melting point above a temperature of combustion gases inside the rotor cavity 20. Thus, the metallic member 72 may be able to protect the elastomeric member 71 from impingement with hot combustion gases exiting the rotor cavity 20 via the gap G.

The elastomeric member 71 may have a substantially round shape when not received in the groove 118C of the rotor housing 118. However, this groove 118C typically extends annularly all around the rotor cavity 20 and may have a shape matching that of the housing assembly 12. Thus, the elastomeric member 71 may have an epitrochoid, ellipsoid, or oval shape when inserted into the groove 118C. As illustrated, the elastomeric member 71 is disposed radially outwardly of the metallic member 72. The metallic member 72 axially overlaps an entirety of the elastomeric member 71 to avoid leaving exposed a portion of the elastomeric member 71. The elastomeric member 71 and the metallic member 72 axially overlap one another relative to a central axis thereof. Both of the elastomeric member 71 and the metallic member 72 may be continuous along a full circumference. However, in some embodiments, the metallic member 72 may include a plurality of shield segments circumferentially distributed and secured to one another.

Figure 8:
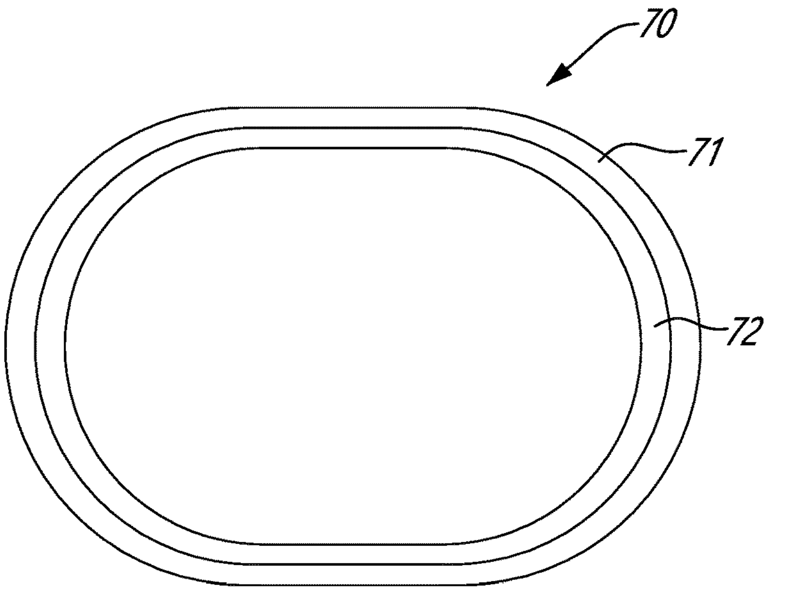
FIG. 8 is a top view of a seal for the side housing of FIG. 7.

Referring to FIG. 8, the seal 70 is shown. The elastomeric member 71 may have a rounded shape, but may be sufficiently compliant to adopt an oval, ellipsoid, or epitrochoid shape when received within the groove. The metallic member 72 may be less compliant due to its stiffness. Hence, the metallic member 72 may be manufactured with the epitrochoid, ellipsoid or oval shape corresponding to that of the groove since it may be less compliant.

As aforementioned, the axial force exerted by the metallic member 72 is preferably high enough to seal, but not too high in order to still permit movements of the side plate 116 due to thermal growth. The metallic member 72 of the present disclosure may satisfy these requirements.

Figure 9:
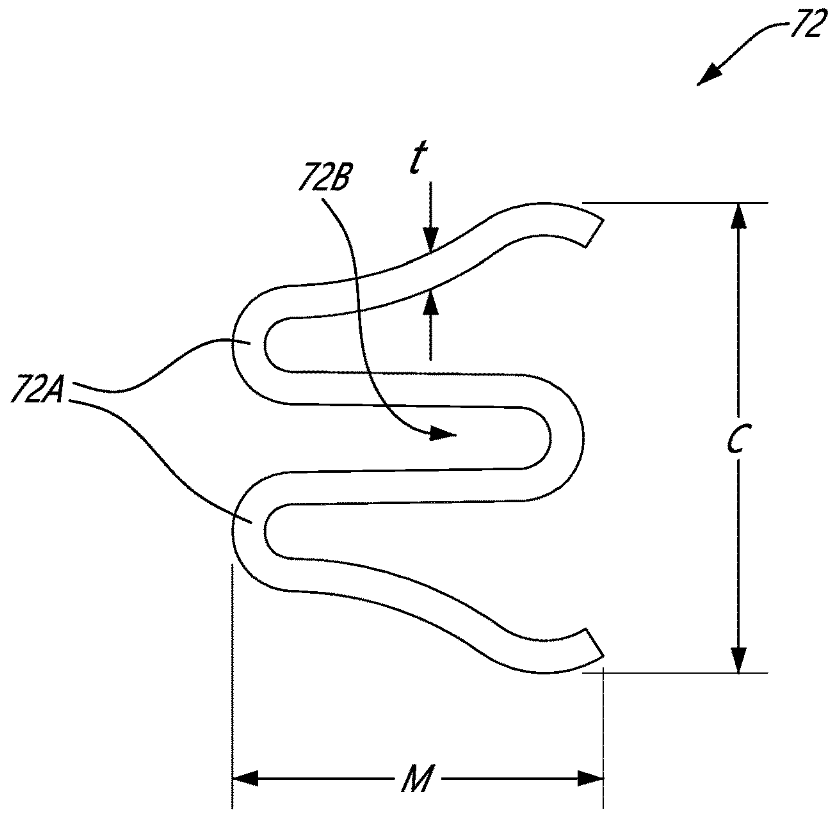
FIG. 9 is a cross-sectional view of a metallic shield of the seal of FIG. 8.
Figure 11:
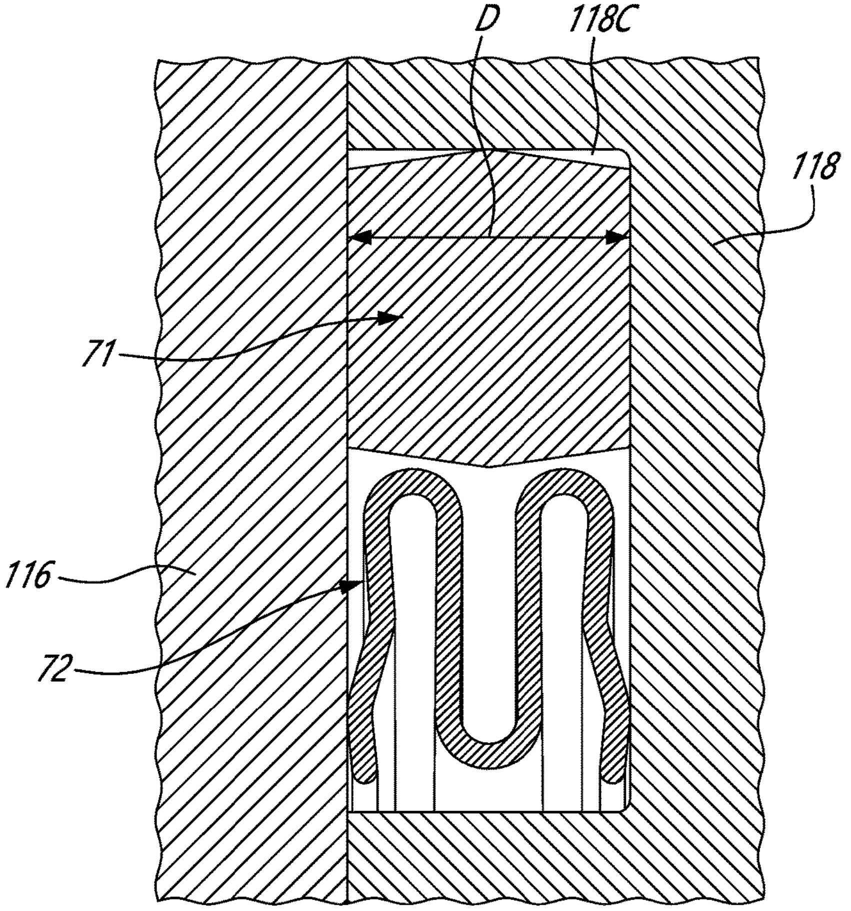
FIG. 11 is a cutaway view of the seal installed on the side housing of FIG. 7 with the rotor housing installed.

Referring now to FIG. 9, the metallic member 72 is shown in greater details. The metallic member 72 has a cross-section defining an E-shape. In other words, the metallic member 72 has a cross-section that includes at least two crests 72A and a valley 72B disposed between the at least two crests 72A. The metallic member 72 may have more than two crests 72A and more than one valley 72B. The metallic member 72 is compressible in a direction being parallel to the axis. In other words, the metallic member 72 is compressible by decreasing a distance between the two crests 72A. Put differently, the metallic member 72 may have a sinusoidal shape defining a plurality of U-shaped sections interconnected to one another. The metallic member 72 may thus have W-shape. As shown in FIG. 11, the metallic member 72 may include two flanges each abutting a respective one of the side plate 116 and the rotor housing 118. The two flanges may be movable towards one another upon compression of the metallic member 72 in a direction parallel to the axis. The two flanges may end at tips. The tips may face the rotor cavity.

The metallic member 72 has a thickness t, a height c, a width M, and a number of crests 72A and valley(s) 72B that are selected such that a pressure force generated by the metallic member 72 on the side plate 116 is at most about 150 pounds by inch of length of the metallic member 72 during operation (e.g., hot) of the rotary engine 10. Preferably, the pressure force generated by the metallic member 72 is at most 100 pounds by inch of length of the metallic member 72 during operation of the rotary engine 10. The thickness t, the height c, the width M, and the number of crests 72A and valley(s) 72B are also selected such that the pressure force generated by the metallic member 72 on the side plate 116 is at least 25 pounds by inch of length when the rotary engine 10 is non-operating (e.g., cold). Any seals able to withstand the temperature of the combustion gases and able to generate at least 25 pounds by inch and at most from 100 to 150 pounds by inch of pressure are contemplated.

Figure 10:
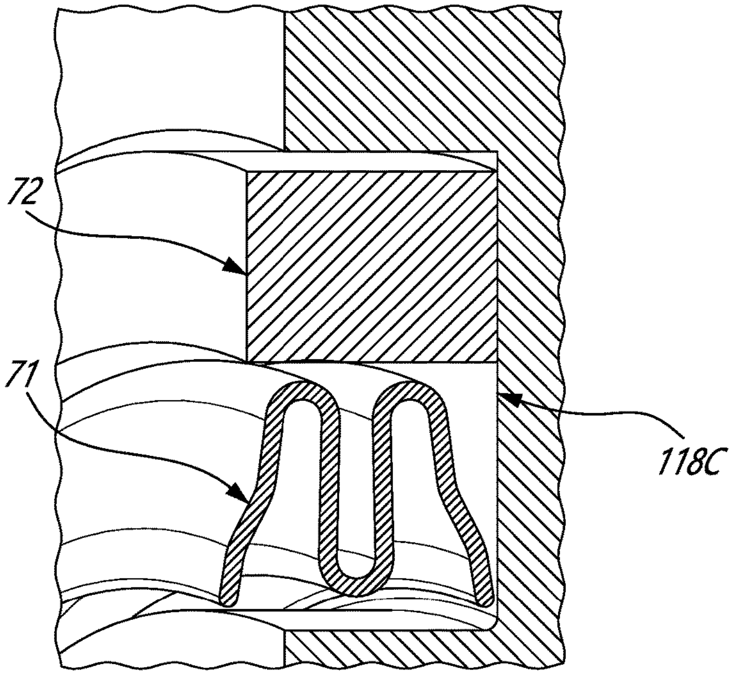
FIG. 10 is a cutaway view of the seal installed on the side housing of FIG. 7 before installation of a rotor housing.

Referring now to FIGS. 10-11, in a default, or at-rest shape of the seal 70, both of the elastomeric member 71 and the metallic member 72 have a height that is greater than a depth D (FIG. 11) of the groove 118C. FIG. 10 illustrates that, with the side plate 116 removed, the metallic member 72 and the elastomeric member 71 protrude out of the groove 118C while being abutted against a bottom wall of the groove 118C. Thus, once the side plate 116 is installed, the elastomeric member 71 and the metallic member 72 are biased in a compressed shape in which they exert an axial force on both of the rotor housing 118 and the side plate 116. This force may effectively seal the combustion chamber from the coolant passages.

In an alternate embodiment, the metallic member 72 may be a W-seal, or any other suitable metallic member made of a material able to withstand the harsh temperatures of the combustion gases. This material may be, for instance, Inconel™ or Titanium. These metallic members may not be able to provide sufficient sealing, thus the use of the elastomeric material. However, if a metallic member were able to provide adequate sealing, it may also exert too high of an axial load on the side plate 116, which is undesirable.

Some metallic members, such as some configurations of C-seals, may be unsuitable for this application because they would provide an axial pressure greater than the aforementioned threshold. The metallic member 72 disclosed herein was found to provide the adequate compromise between sealing and axial pressure.

Figure 12:
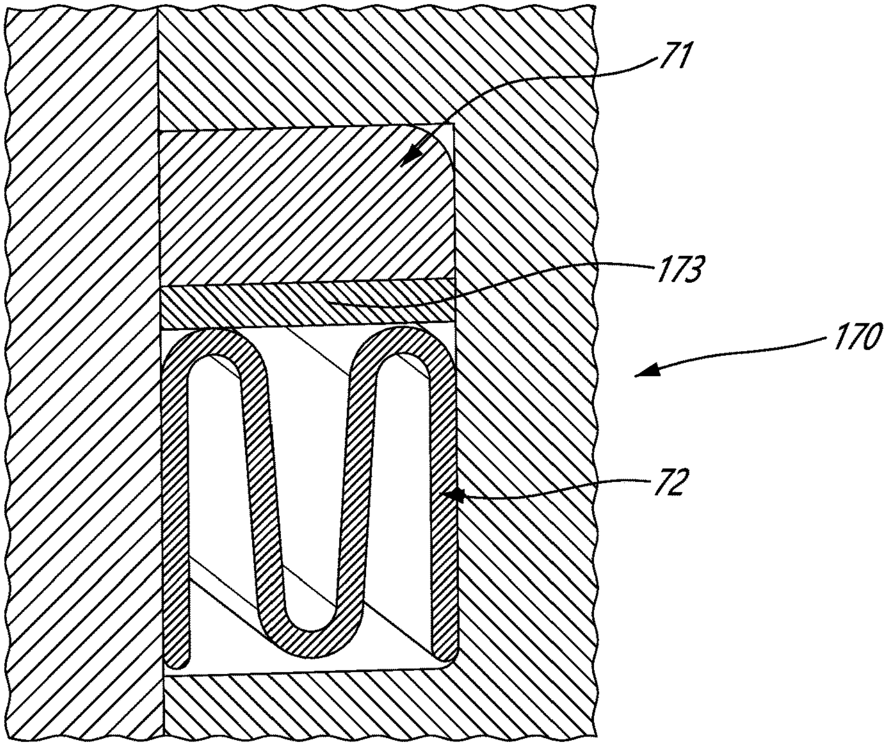
FIG. 12 is a cutaway view of a seal in accordance with another embodiment installed on the side housing of FIG. 7.

Referring now to FIG. 12, another embodiment of a seal is shown at 170. In the embodiment shown, the seal 170 includes the metallic member 72 and the elastomeric member 71 described above, but further includes a liner 173, which may be made of high-temperature silicone, polytetrafluoroethylene (PTFE), fluorinated ethylene propylene (FEP), or any other suitable material. The liner 173 may be disposed radially (e.g., sandwich) between the elastomeric member 71 and the metallic member 72. The liner 173 may axially overlap both of the metallic member 72 and the elastomeric member 71.

The liner 173 may have two functions. The first is to provide a mechanical support by presenting a harder surface for the metallic member 72 to seat when combustion pressure tries to displace it radially toward the elastomeric member 71. The second function is to insulate the elastomeric member 71 from being in direct contact with the high temperature metal, therefore transferring heat that may degrade its mechanical properties.

Figure 13:
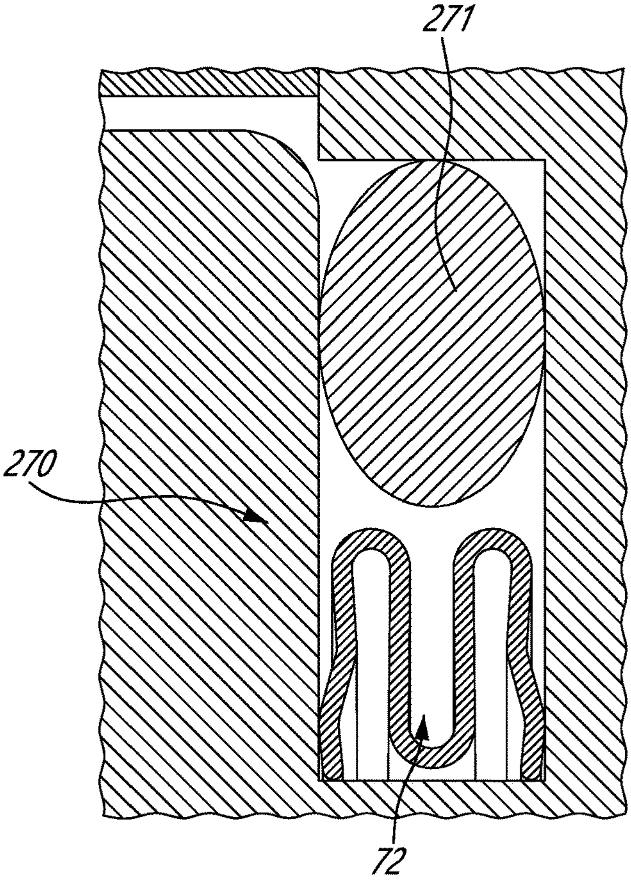
FIG. 13 is a cutaway view of a seal in accordance with another embodiment installed on the side housing of FIG. 7.

Referring now to FIG. 13, another embodiment of a seal is shown at 270. In this embodiment, the seal 270 includes the metallic member 72 described above with an elastomeric member 271 having a rounded or circular cross-sectional shape instead of a polygonal shape.

Figure 14:
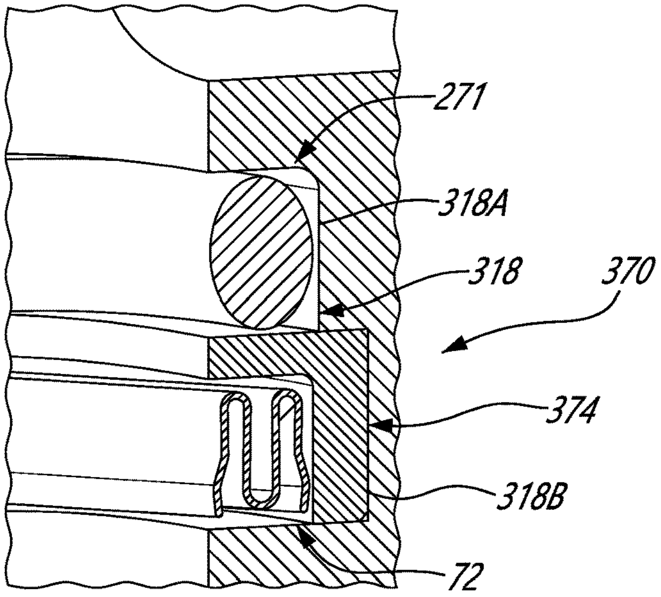
FIG. 14 is a cutaway view of a seal in accordance with another embodiment installed on the side housing of FIG. 7.

Referring now to FIG. 14, another embodiment of a seal is shown at 370. In the embodiment shown, the seal 370 includes the elastomeric member 271 of the embodiment of FIG. 13, although it may alternatively includes the elastomeric member 71 of the embodiment of FIG. 10, the metallic member 72, and a protection ring 374. The seal 370 is received within a groove 318 of another embodiment. The groove 318 has two sections, namely a first section 318A and a second section 318B. A depth of the second section 318B is greater than a depth of the first section 318A. The "depth" is taken in the axial direction relative to the rotation axis of the rotor 24 of the rotary engine 10. The protection ring 374 has a L-shape cross-section and has two legs: one of the two legs sits within the second section 318B of the groove 318 and the other of the two legs is disposed radially between the elastomeric member 271 and the metallic member 72. The protection ring 374 may be made of stainless steel or any other suitable material. The protection ring 374 may improve wear of the rotor housing 118 and may isolate the metallic member 72 from the elastomeric member 271.

Since the metallic member 72 operates at elevated temperature, it may be desirable to isolate the elastomeric member 271 from the metal seal direct contact. The protection ring 374 may reduce the heat transfer to the elastomeric member 271 by preventing a direct contact and by diffusing heat in the protection ring 374. In turn, this heat is partially dissipated to the rotor housing 118 where it contacts the protection ring 374 at the second section 318B of the groove 318.

Figure 15:
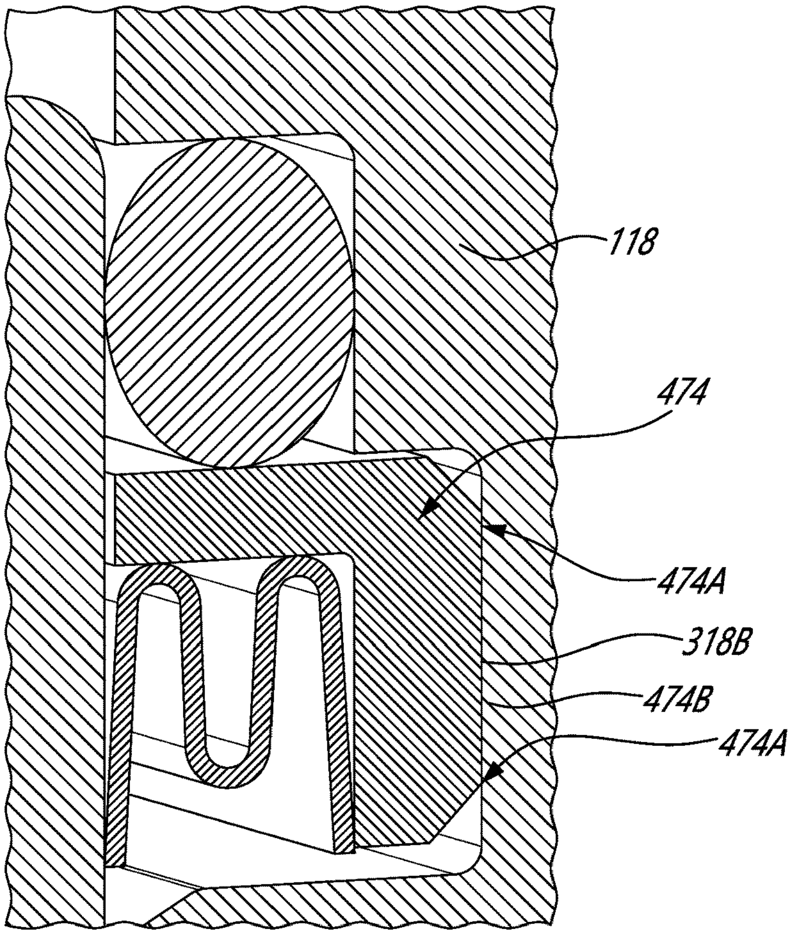
FIG. 15 is a cutaway view of a seal in accordance with another embodiment installed on the side housing of FIG. 7.

Referring now to FIG. 15, another embodiment of a seal is shown at 470. In the embodiment shown, the seal 470 includes the elastomeric member 271 of the embodiment of FIG. 13, although it may alternatively includes the elastomeric member 71 of the embodiment of FIG. 10, the metallic member 72, and a protection ring 474, similar to the protection ring 374 described above with reference to FIG. 14. For the sake of conciseness, only features differing from the seal 370 of FIG. 14 are described below.

In this embodiment, the leg of the protection ring 474 that sits within the second section 318B of the groove 318 has two chamfers 474A each located on a respective one of opposite sides of a face 474B that abuts the rotor housing 118 within the groove 318.

The chamfers may ensure positive contact at the second section 318B of the groove 318. This contact may provide more efficient heat flow between the two parts. The chambers 474A on the protection ring 474 may prevent mechanical contact between the protection ring 474 and the rotor housing 118 at locations where the groove 318 defines fillets. In other words, if the chamfers were absent, a contact between an edge of the protection ring 474 and a fillet may create a gap between the protection ring 474 and a bottom face of the second section 318B of the groove 318. The chamfers 474A may prevent such a contact.

Figure 16:
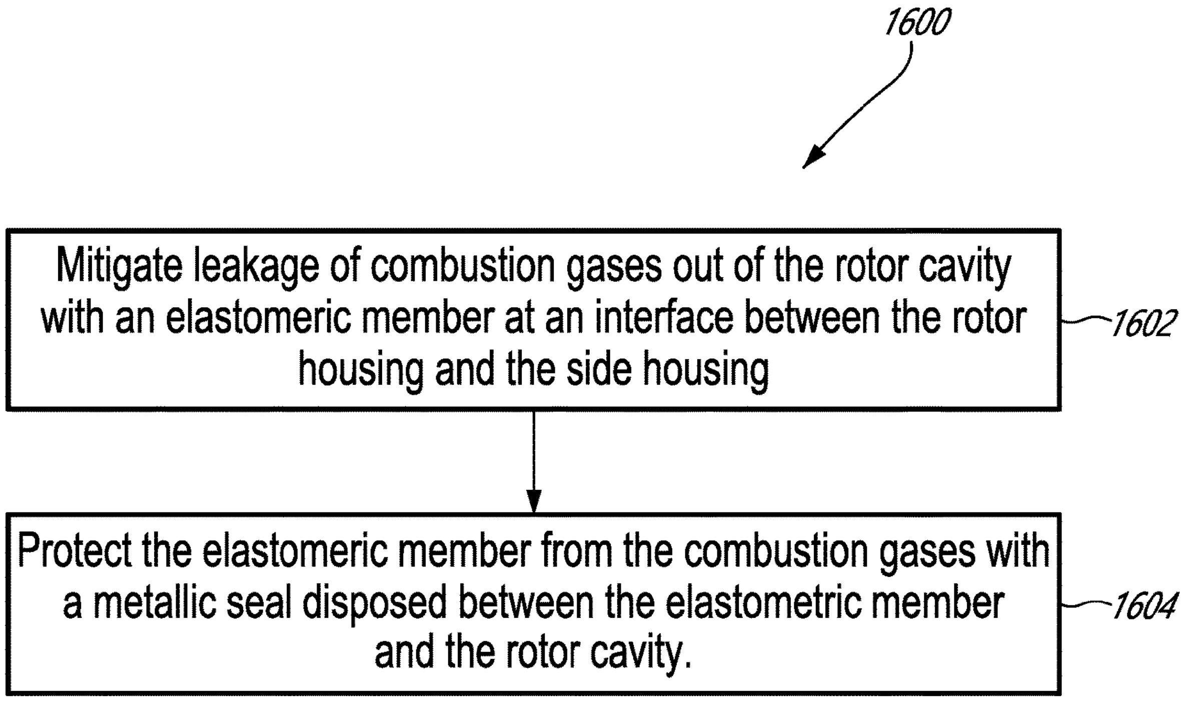
FIG. 16 is a flowchart illustrating steps of a method of sealing a rotor cavity of the rotary internal combustion engine of FIG. 1.

Referring now to FIG. 16, a method of sealing a rotor cavity of a rotary internal combustion engine is shown at 1600. The method 1600 includes: mitigating leakage of combustion gases out of the rotor cavity with the elastomeric member 71, 271 disposed at an interface between the rotor housing 18, 118 and the side housing 11 secured to the rotor housing 18, 118 at 1602; and protecting the elastomeric member 71, 271 from the combustion gases with the metallic member 72 disposed between the elastomeric member 71, 271 and the rotor cavity at 1602.

In the present embodiment, the protecting of the elastomeric member 71, 271 from the combustion gases with the metallic member 72 includes compressing the metallic member 72, which may be an E-seal, between the rotor housing 18 and the side housing 11.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A housing assembly for a rotary internal combustion engine, comprising:

a rotor housing extending around an axis, the rotor housing having an inner face facing a rotor cavity, a first side and a second side opposite to the first side;

a first side housing secured to the first side of the rotor housing, and a second side housing secured to the second side of the rotor housing, the rotor cavity bounded axially between the first side housing and the second side housing, the first side housing including a side wall secured to the rotor housing and a side plate, a peripheral section of the side plate disposed between the side wall and the rotor housing; and a seal received within a groove at an interface between the rotor housing and the first side housing, the groove annularly extending around the axis, located outwardly of the inner face of the rotor housing, and overlapping a peripheral section of the first side housing, the seal having:

an elastomeric member compressed between the peripheral section of the first side housing and the rotor housing; and a metallic member disposed inwardly of the elastomeric member relative to the axis, the metallic member in contact with both of the peripheral section of the first side housing and the rotor housing, a stiffness of the metallic member is such that a pressure force generated by the metallic member on the side plate is at most 150 pounds by inch of length of the metallic member when the rotary internal combustion engine is non-operating.

2. The housing assembly of claim 1, wherein a gap is defined between the rotor housing and the peripheral section of the side plate, the groove communicating with the rotor cavity through the gap.

3. The housing assembly of claim 1, wherein a cross-section of the metallic member includes at least two crests and a valley located between the at least two crests, the metallic member being compressible in a direction parallel to the axis.

4. The housing assembly of claim 3, wherein a cross-section of the metallic member has an E-shape.

5. The housing assembly of claim 1, wherein the pressure force is at least 25 pounds by inch.

6. The housing assembly of claim 1, wherein the metallic member is made of a material having a melting point above a temperature of combustion gases inside the rotor cavity.

7. The housing assembly of claim 1, comprising a coolant circuit within the rotor housing, the first side housing, and the second side housing, the seal fluidly separating the coolant circuit from the rotor cavity.

8. A rotary internal combustion engine comprising:

a rotor;

a rotor housing extending around an axis, the rotor housing having an inner face facing a rotor cavity containing the rotor, a first side and a second side opposite to the first side;

a first side housing secured to the first side of the rotor housing, a second side housing secured to the second side of the rotor housing, the rotor located axially between the first side housing and the second side housing, and circumscribed by the rotor housing, the first side housing including a side wall secured to the rotor housing and a side plate, a peripheral section of the side plate disposed between the side wall and the rotor housing; and a seal received within a groove at an interface between the first side housing and the rotor housing, the groove annularly extending around the axis, located outwardly of the inner face of the rotor housing, and overlapping a peripheral section of the first side housing, the seal having:

an elastomeric member compressed between the peripheral section of the first side housing and the rotor housing; and a metallic member in contact with both of the peripheral section of the first side housing and the rotor housing, the metallic member located radially between the inner face of the rotor housing and the elastomeric member, the metallic member configured for generating a pressure force on the side plate is at most 150 pounds by inch of length of the metallic member when the rotary internal combustion engine is non-operating.

9. The rotary internal combustion engine of claim 8, wherein a gap is defined between the rotor housing and the peripheral section of the side plate, the groove communicating with the rotor cavity through the gap.

10. The rotary internal combustion engine of claim 8, wherein a cross-section of the metallic member includes at least two crests and a valley located between the at least two crests, the metallic member being compressible in a direction parallel to the axis.

11. The rotary internal combustion engine of claim 8, wherein a cross-section of the metallic member has an E-shape.

12. The rotary internal combustion engine of claim 8, wherein the pressure force is at least 25 pounds by inch.

13. The rotary internal combustion engine of claim 8, wherein the metallic member is made of a material having a melting point above a temperature of combustion gases inside the rotor cavity.

14. The rotary internal combustion engine of claim 8, comprising a coolant circuit within the rotor housing, the first side housing, and the second side housing, the seal fluidly separating the coolant circuit from the rotor cavity.

15. A method of sealing a rotary internal combustion engine having a rotor cavity bounded by a rotor housing and a side housing, the method comprising:

mitigating leakage of combustion gases out of the rotor cavity with an elastomeric member at an interface between the rotor housing and a side plate mounted to a side wall of the side housing; and protecting the elastomeric member from the combustion gases while permitting thermal growth of the side plate relative to the side wall with a metallic member disposed between the elastomeric member and the rotor cavity, the metallic member configured for generating a pressure force on the side plate of at most 150 pounds by inch of length of the metallic member when the rotary internal combustion engine is non-operating.

16. The method of claim 15, wherein the protecting of the elastomeric member from the combustion gases with the metallic member includes compressing an E-seal between the rotor housing and the side housing, a cross-sectional area of the E-seal having a "E" shape.

* * * * *